United States Patent Office 2,883,382
Patented Apr. 21, 1959

2,883,382

BENZO-QUINOLYLAMINO-2-[DI(β-CHLORO-ETHYL)AMINOMETHYL]-PHENOLS

Edward F. Elslager, St. Clair Shores, and Frank H. Tendick, Grosse Pointe Park, Mich., assignors to Parke, Davis & Company, Detroit, Mich., a corporation of Michigan No Drawing. Application August 29, 1957, Serial No. 680,928

6 Claims. (Cl. 260—279)

This invention relates to certain organic amino compounds and to methods for obtaining the same. More particularly, the invention relates to new diaminocresols and salts thereof which in the free base form are represented by the formula:

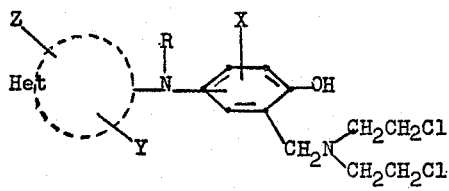

where Het represents a heterocyclic radical attached through a carbon atom and containing one nitrogen atom and at least 9 carbon atoms, such as a quinolyl, acridinyl or benzacridinyl radical, R designates a hydrogen atom or lower alkyl group, and X, Y and Z each represent hydrogen, halogen, lower alkoxy, lower alkyl, lower unsaturated alkyl or phenyl radicals.

In accordance with the invention, the products are produced by reacting a diaminocresol having the formula:

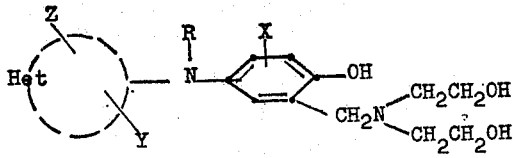

with a chlorinating agent such as thionyl chloride, phosphorus trichloride, phosphorus pentachloride or concentrated hydrochloric acid with or without a catalyst, and if desired, neutralizing the resulting hydrochloride salt product and treating with at least one equivalent of an acid to obtain different salts; where R, X, Y and Z have the above mentioned significance. The preferred chlorination reagent for the reaction is thionyl chloride. Organic solvents may be used with thionyl chloride, phosphorus trichloride and phosphorus pentachloride, but in general, they are not necessary. The temperature at which the reaction is carried out is not critical. Although the reaction takes place below room temperature, it is preferably carried out at room temperature or higher temperature. For thionyl chloride, it is recommended that the reaction be run at approximately 30 to 50° C. for 5 to 16 hours. In general, an excess of the chlorinating agent is used; in the instance of thionyl chloride, a ten-fold excess may be preferred. The length of time required by the reaction varies with the reagent and temperature utilized.

For convenience, the products of the invention are isolated as the hydrochloride salts. As indicated, the hydrochloride salts may be converted by means which are per se known to the corresponding free bases which in turn can be converted by known means to other salts such as the hydrobromide, sulphate, phosphate, oxalate, sulfamate, sulfonate, acetate, lactate, tartrate, gluconate, citrate, arsonate, benzoate, arsanilate, naphthoate, salicylate and the like. Alternatively, salts may be prepared from the hydrochloride and a suitable amount of the basic salt of an acid by usual double decomposition procedures.

The products are useful as agricultural fungicides, particularly against *Alternaria solani*, the causative agent of early blight in tomatoes. For this purpose, the products are ordinarily dispersed in water with the aid of a surface active dispersing and wetting agent to provide aqueous spray compositions containing 0.5 to 0.12 pound of the product per hundred gallons of finished spray.

The intermediates for the above reaction are prepared by performing a Mannich reaction on an acetylaminophenol with diethanolamine and formaldehyde or a formaldehyde generating agent such as paraformaldehyde. The resultant 2,2'-[(acetylamino)-hydroxybenzylimino]-diethanol is not isolated, but is hydrolyzed in situ with 1:1 hydrochloric acid to give the appropriate 2,2'-[(amino)-hydroxybenzylimino]-diethanol. This product is then condensed with a holaheterocycle to give the desired intermediate. Such heterocycles include pyridines, quinolines, benzoquinolines, acridines, benzacridines, and various substituted heterocycles of the same classes. Alternately, a 4-aminophenol is condensed with the haloheterocycle and the resultant 4-hydroxyanilinoheterocycle of formula:

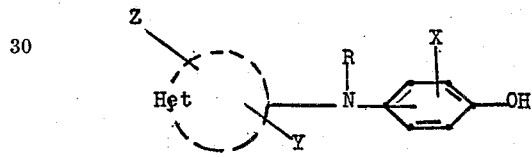

is utilized in a Mannich reaction with formaldehyde or a formaldehyde generating agent and diethanolamine.

This invention is illustrated but not limited by the following examples:

Example 1

2,2' - [5 - (7 - chloro - 4 - quinolylamino) - 2 - hydroxybenzylimino]-diethanol (5.8 g., 0.015 mole) is added portionwise to 20 ml. of thionyl chloride with stirring, and the reaction mixture is allowed to stand at room temperature for 16 hours. The excess thionyl chloride is removed by decantation and the brown oily residue is dissolved in absolute ethanol, treated with decolorizing charcoal, filtered and the filtrate evaporated to about 50 ml. The solution is cooled and poured slowly into 500 ml. of anhydrous ether with vigorous stirring. The pale yellow precipitate is collected by filtration and crystalized from ethanol. This product is α - [bis - (2 - chloroethyl) - amino] - 4 - (7 - chloro - 4-quinolylamino)-o-cresol, dihydrochloride sesquihydrate, M.P. 120° C., (dec.). The product has the following formula:

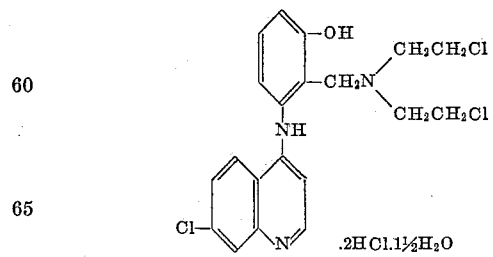

In like manner, the following related compounds can be prepared, starting from the appropriate 2,2'-[(4-quinolylamino)-hydroxybenzylimino]-diethanol:

α - [Bis(2-chloroethyl)-amino]-4-(6-methoxy-4-quinolylamino)-o-cresol, dihydrochloride α - [Bis(2-chloroethyl)-amino]-4-(6-methoxy-2-methyl-4-quinolylamino)-o-cresol, dihydrochloride α - [Bis(2 - chloroethyl) - amino] - 4 - [7 - chloro - 2 - (p - chlorophenyl) - 4 - quinolylamino] - o - cresol, dihydrochloride 6 - allyl - α - [Bis(2 - chloroethyl) - amino] - 4 - (7 - chloro - 4 - quinolylamino) - o - cresol, dihydrochloride α - [Bis(2 - chloroethyl) - amino] - 4 - (7 - chloro - 4 - quinolylamino) - 6 - phenyl - o - cresol, dihydrochloride α - [Bis(2 - chloroethyl) - amino] - 5 - (7 - chloro - 4 - quinolylamino) - o - cresol, dihydrochloride 6 - [Bis(2 - chloroethyl) - aminomethyl] - 4 - (7 - bromo - 4 - quinolylamino) - guaiacol, dihydrochloride α - [Bis(2 - chloroethyl) - amino] - 4 - (7 - ethoxy - 4 - quinolylamino) - 2,6 - xylenol, dihydrochloride α - [Bis(2 - chloroethyl) - amino] - 6 - chloro - 4 - (7-chloro - 4 - quinolylamino) - o - cresol, dihydrochloride α - [Bis(2 - chloroethyl) - amino] - 4 - (7 - chloro - 4 - quinolylamino) - 6 - (2 - methylallyl) - o - cresol, dihydrochloride The starting material, 2,2'-[5-(7-chloro-4-quinolylamino)-2-hydroxybenzylimino]-diethanol, can be prepared as follows: paraformaldehyde (30 g., 1.0 mole), diethanolamine (105 g., 1.0 mole) and 100 ml. of ethanol are heated cautiously until a clear solution is formed. A hot solution of 151 g. (1.0 mole) of 4'-hydroxyacetanilide in 100 ml. of ethanol is then added to the amine-aldehyde solution, and the mixture boiled under reflux for 3 hours; 500 ml. of 1:1 hydrochloric acid is then added, and the resulting mixture boiled under reflux for 2 hours with the evaporation of most of the alcohol. Volatile materials are removed in vacuo, and anhydrous benzene is evaporated from the residue several times to dry the crude diamine dihydrochloride. To this residue is added 198 g. (1.0 mole) of 4,7-dichloroquinoline and 400 g. of phenol, and the melt is stirred and heated at 130–140° for 3 hours. The melt is poured into a beaker using absolute ethanol for rinsing. A few drops of alcoholic hydrogen chloride are added to make the solution strongly acidic to Congo red. The mixture is diluted with five volumes of acetone, the gummy precipitate which separates is allowed to settle, and the acetone is separated by decantation. Trituration of the residue with anhydrous ether gives a granular solid which is collected by filtration and dried in vacuo. The crude product is triturated with acetone containing a small excess of concentrated ammonium hydroxide, and the acetone solution is decanted from solid salts. The acetone solution is treated with decolorizing charcoal and evaporated to a volume of 2 liters. The warm acetone solution is diluted with 1.5 volumes of hot water and the base is allowed to crystallize. The pale yellow crystals are collected by filtration, triturated with cold 50% ethanol and dried in vacuo at 40° C. This is the intermediate 2,2'-[5-(7-chloro-4-quinolylamino)-2-hydroxybenzylimino] - diethanol, M.P. 193–195°. Other intermediate 2,2'[(4-quinolylamino) - hydroxybenzylimino] - diethanols are prepared in like manner starting with formaldehyde or a formaldehyde generating agent, diethanolamine, and the appropriate hydroxyacetanilide and haloquinoline.

*Example 2*

To 30 ml. of thionyl chloride is slowly added portionwise 4.0 g. (0.01 mole) of 2,2'-[5-(benzo[h]quinolin-4-ylamino)-2-hydroxybenzylimino]-diethanol with frequent shaking. The reaction mixture is allowed to stand at room temperature for 18 hours and the excess thionyl chloride removed in vacuo. The residue is dissolved in absolute ethanol and the solution is treated with decolorizing charcoal. The ethanol solution is poured slowly with vigorous stirring into 1 l. of anhydrous ether, and the desired α-[bis(2-chloroethyl)-amino]-4-(benzo[h]quinolin - 4 - ylamino)-o-cresol, dihydrochloride of formula:

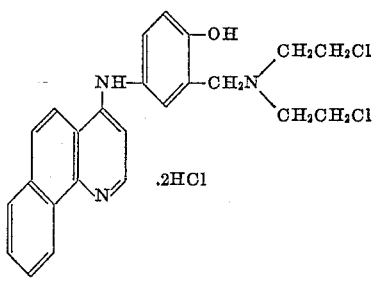

is collected by filtration, washed thoroughly with dry acetone and ether and dried.

In like manner, the following related compounds can be prepared starting from the appropriate 2,2'-[(benzo[h]quinolin-4-ylamino)-hydroxybenzylimino]-diethanol:

α - [Bis(2 - chloroethyl) - amino] - 4 - (2 - methyl - benzo[h]quinolin - 4 - ylamino) - o - cresol, dihydrochloride 5 - (benzo[h]quinolin - 4 - ylamino) - α - [bis(2 - chloroethyl) - amino] - o - cresol, dihydrochloride 4 - (benzo[h]quinolin - 4 - ylamino) - α - [bis(2 - chloroethyl) - amino] - 6 - phenyl - o - cresol, dihydrochloride α - [Bis(2 - chloroethyl) - amino] - 6 - chloro - 4 - (2-methylbenzo[h]quinolin - 4 - ylamino) - o - cresol, dihydrochloride 2,2' - [5 - (benzo[h]quinolin - 4 - ylamino) - 2 - hydroxybenzylimino]-diethanol, employed as a starting material for the above procedure, can be prepared from paraformaldehyde, diethanolamine, 4'-hydroxyacetanilide and 4-chlorobenzo[h]quinoline in accordance with the method set forth under Example 1 herein for the preparation of 2,2'-[5-(7-chloro-4-quinolylamino)-2-hydroxybenzylimino]-diethanol. Other intermediate 2,2'-[(benzo[h]quinolin-4-ylamino)-hydroxy benzylimino]-diethanols are prepared in like manner starting with formaldehyde or a formaldehyde generating agent, diethanolamine or the appropriate hydroxyacetamide and halobenzo[h]quinoline.

*Example 3*

With vigorous swirling, 8.0 g. (0.02 mole) of 2,2'-[5-(benzo[f]quinolin - 1 - ylamino) - 2 - hydroxybenzylimino]-diethanol is slowly added to 65 ml. of thionyl chloride. A considerable quantity of hydrogen chloride fumes are evolved. After standing at room temperature for 20 hours, the excess thionyl chloride is removed in vacuo and the residue dissolved in absolute methanol (decolorizing charcoal). The methanol solution is poured in a thin stream with vigorous stirring into a 1.5 l. of anhydrous ether. The precipitate is collected by filtration, washed thoroughly with anhydrous acetone and ether and dried in vacuo at 35° C. for 24 hours. This is the desired 4 - (benzo[f]quinolin-1-yl-amino)-α-[bis(2-chloroethyl)-amino]-o-cresol, dihydrochloride, of formula:

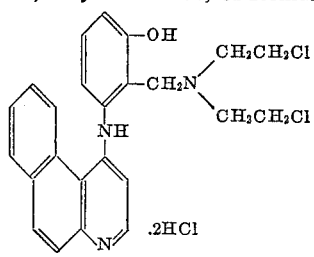

In like manner, the following related compounds can be prepared, starting from the appropriate 2,2'-[(benzo[f]quinolin-1-ylamino) - hydroxybenzylimino] - diethanol:

4-(benzo[f]quinolin - 1 - ylamino)-α-[bis(2-chloroethyl)-amino]-6-phenyl-o-cresol, dihydrochloride 4-(benzo[f]quinolin - 1 - ylamino)-α-[bis(2-chloroethyl)-amino]-6-chloro-o-cresol, dihydrochloride 6-allyl-4-(benzo[f]quinolin-1-ylamino)-α-[bis(2 - chloroethyl)-amino]-o-cresol, dihydrochloride 5-(benzo[f]quinolin - 1 - ylamino)-α-[bis(2-chloroethyl)-amino]-o-cresol, dihydrochloride 2,2'-[5 - (benzo[f]quinolin-1-ylamino)-2-hydroxybenzylimino]-diethanol, utilized as a starting material for the above preparation, can be prepared from diethanolamine, paraformaldehyde, 4'-hydroxyacetanilide and 1-chlorobenzo[f]quinoline in accordance with the method set forth under Example 1 herein for the preparation of 2,2'-[5-(7-chloro-4-quinolylamino) -2- hydroxybenzylimino]-diethanol. Other intermediate 2,2'-[(benzo[f]quinoline-1-ylamino)-hydroxybenzylimino]-diethanols are synthesized in like manner starting with diethanolamine, formaldehyde or a formaldehyde generating agent and the appropriate hydroxyacetanilide and halobenzo[f]quinoline.

*Example 4*

Dry 2,2'-{5-[(7-chloro-4-quinolyl)-methylamino]-2-hydroxybenzylimino}-diethanol, dihydrochloride (4.7 g., 0.01 mole) is added portionwise to 20 ml. of thionyl chloride, swirling the flask until each portion is dissolved, and maintaining the temperature below 35° C. The flask is stoppered with a calcium chloride tube and the mixture allowed to stand for 18 hours. The excess thionyl chloride is removed in vacuo, the brown residue is dissolved in absolute ethanol, and the ethanol solution treated with decolorizing charcoal and concentrated to approximately 50 ml. The cooled ethanol solution is poured slowly with stirring into 600 ml. of anhydrous ether and the yellow product which separates is collected by filtration, washed thoroughly with anhydrous ether and dried in vacuo for 18 hours. This is the desired α-[bis(2-chloroethyl)-amino]-4-[(7-chloro - 4 - quinolyl) - methylamino]-o-cresol, dihydrochloride, of formula:

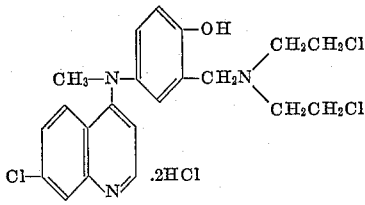

In like manner, the following related compounds can be prepared, starting from the appropriate 2,2'-[(heterocyclicalkylamino)-hydroxybenzylimino]-diethanol:

α-[Bis(2-chloroethyl)-amino]-4-[(6-chloro - 2 - methoxy-9-acridinyl)-methylamino]-o-cresol, dihydrochloride 4-[(benz[c]acridin-7-yl)-methylamino]-α-[bis(2 - chloroethyl)-amino]-o-cresol, dihydrochloride α-[Bis(2-chloroethyl) - amino] - 4 - [ethyl(6 - methoxy-2-methyl-4-quinolyl)-amino]-o-cresol, dihydrochloride 4[(benz[c]acridin-12-yl)-methylamino] - α - [bis(2-chloroethyl)-amino]-o-cresol, dihydrochloride 4-[(benz[h]quinolin-4-yl)-ethylamino - α - [bis(2-chloroethyl)-amino]-o-cresol, dihydrochloride 4-[(benzo[f]quinolin-1-yl)-methylamino]-α-[bis (2-chloroethyl)-amino]-o-cresol, dihydrochloride 4-[(benz[a]acridin-12-yl)-methylamino]-α-[bis(2 - chloroethyl)-amino]-o-cresol, dihydrochloride The intermediate 2,2'-{5-[(7-chloro-4-quinolyl)-methylamino]-2-hydroxybenzylimino}-diethanol, dihydrochloride can be prepared by the following procedure: A mixture of 81.5 g. (0.41 mole) of 4,7-dichloroquinoline, 68.8 g. (0.2 mole) of p-methylaminophenol sulfate and 150 g. of phenol is stirred and heated at 140° C. for two hours. The clear melt is transferred to a beaker, and a few drops of ethanolic hydrogen chloride are added. The resulting mixture is diluted with one volume of acetone followed by five volumes of anhydrous ether. The red oil which precipitates is triturated thoroughly with anhydrous ether, stirred with excess saturated sodium bicarbonate solution, and the precipitate collected by filtration and the filter cake washed successively with ether, saturated sodium bicarbonate and water. The solid is dried, digested with 400 ml. of boiling 95% ethanol, cooled, collected by filtration and dried again. Recrystallization from ethanol gives 4-[(7-chloro - 4 - quinolyl) - methylamino]-phenol, M.P. 256–258° C.

A mixture of 15.7 g. (0.15 mole) of diethanolamine, 4.5 g. (0.15 mole) of paraformaldehyde and 100 ml. of 1-propanol is heated to a clear solution. This solution is added to a suspension of 27.5 g. (0.096 mole) of 4-[(7-chloro-4-quinolyl)-methylamino]-phenol in 250 ml. of 1-propanol and the mixture boiled under reflux for 4 hours. The mixture is filtered hot and the residue boiled under reflux with a second portion of diethanolamine-paraformaldehyde solution in 1-propanol. The mixture is filtered, and the combined filtrates evaporated to a syrup in vacuo. This residue is made strongly alkaline with sodium hydroxide solution and extracted thoroughly with chloroform. The combined chloroform extracts are washed successively with 5% sodium hydroxide solution and water, filtered and evaporated to a gum in vacuo. The residue is dissolved in absolute ethanol (decolorizing charcoal) and treated with an excess of ethanolic hydrogen chloride. The ethanol solution is poured slowly with stirring into 2 l. of anhydrous ether to give the desired 2,2'-{5-[(7-chloro-4-quinolyl) - methylamino]-2-hydroxybenzylimino}-diethanol, dihydrochloride, ¾ hydrate as a hygroscopic pale yellow powder of indefinite melting point.

Other intermediate 2,2'-[(heterocyclicalkylamino)-hydroxybenzylimino]-diethanols can be preperd in like manner starting with diethanolamine, formaldehyde or a formaldehyde generating agent and the appropriate alkylaminophenol and haloheterocyclic compound.

*Example 5*

A suspension of 36.8 g. (0.068 mole) of 2,2'-[5-(6-chloro-2-methoxyacridin-9-ylamino)-2-hydroxybenzylimino]-diethanol in 200 ml. of thionyl chloride is stirred vigorously at room temperature for 19 hours. An additional 50 ml. of thionyl chloride is then added and stirring is continued for 24 hours. The solid is collected by filtration, washed thoroughly with petroleum ether (B.P. 30–60° C.) and ether and dried in vacuo. This is the desired α - [bis-(2-chloroethyl)-amino]-4-(6-chloro-2-methoxy-9-acridinylamino)-o-cresol, dihydrochloride, of formula:

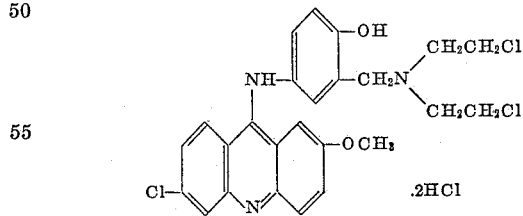

M.P. 195–196° C. (dec.).

In like manner, the following related compounds can be prepared, starting from the appropriate 2,2'-[(acridin-9-ylamino)-hydroxybenzylimino]-diethanol:

α-[Bis(2-chloroethyl)-amino]-4-(6-chloro-2-phenyl - 9- acridinylamino)-o-cresol, dihydrochloride 6-alkyl-α-[bis(2-chloroethyl)-amino]-4-(3,6 - dichloro-9-acridinylamino)-o-cresol, dihydrochloride α-[Bis(2-chloroethyl)-amino]-4-(2-methoxy-9 - acridinylamino)-o-cresol, dihydrochloride α-[Bis(2-chloroethyl)-amino]-4-(3-chloro - 6 - methyl - 9-acridinylamino)-6-phenyl-o-cresol, dihydrochloride α-[Bis(2-chloroethyl)-amino]-4-(3 - chloro - 9 - acridinylamino)-o-cresol, dihydrochloride α-[Bis(2-chloroethyl)-amino]-6-chloro - 4 - (3 - chloro-6-methoxy-9-acridinylamino)-o-cresol, dihydrochloride 2,2'-[5-(6-chloro-2-methoxyacridin-9-ylamino) - 2 - hydroxybenzylimino]-diethanol, employed as a starting material for the above procedure, can be prepared from paraformaldehyde, diethanolamine, 4'-hydroxyacetanilide and 6,9-dichloro-2-methoxyacridine in accordance with the method set forth under Example 1 herein for the preparation of 2,2'-[5-(7-chloro-4-quinolylamino)-2-hydroxybenzylimino]-diethanol. Other intermediate 2,2'-[(acridin-9-ylamino)-hydroxybenzylimino]-diethanols are prepared in like manner starting with formaldehyde or a formaldehyde generating agent, diethanolamine, and the appropriate hydroxyacetanilide and haloacridine.

*Example 6*

A suspension of 10.6 g. (0.02 mole) of anhydrous 2,2'-[5 - (benz[c]acridin-7-ylamino)-2-hydroxybenzylimino]-diethanol, dihydrochloride in 150 ml. of thionyl chloride is stirred vigorously at room temperature for 24 hours. An additional 50 ml. of thionyl chloride is added and the mixture is stirred at room temperature for an additional 24 hours. The excess thionyl chloride is removed in vacuo on the steam bath, and the residue treated cautiously with absolute ethanol. The ethanol mixture is stirred into 2 l. of anhydrous ether and the desired 4-(benz[c]acridin-7-ylamino)-α-[bis(2-chloroethyl)-amino]-o-cresol, dihydrochloride of formula

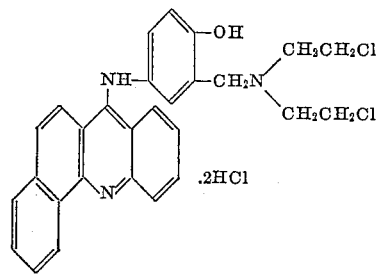

is collected by filtration and washed thoroughly with anhydrous ether.

In like manner, the following related compounds can be prepared, starting from the appropriate 2,2'-[(benz[c]acridin-7-ylamino)-hydroxybenzylimino]-diethanol:

α-[Bis(2-chloroethyl)-amino]-4 - (10 - chlorobenz[c]acridin-7-ylamino)-o-cresol, dihydrochloride 6-allyl-4-(benz[c]acridin-7-ylamino)-α-[bis(2 - chloroethyl)-amino]-o-cresol, dihydrochloride 6-[bis(2-chloroethyl)-aminomethyl]-4 - (3 - methoxybenz[c]acridin-7-ylamino)-o-cresol, dihydrochloride α-[Bis(2-chloroethyl)-amino]-4-(2-methoxy-benz[c]acridin-7-ylamino)-2,6-ylenol, dihydrochloride 6-[bis(2-chloroethyl)-aminomethyl] - 4- (3- methoxybenz[c]acridin-7-ylamino)-guaiacol, dihydrochloride 5-[benz[c]acridin-7- ylamino) - α - [bis(2 - chloroethyl)-amino]-o-cresol, dihydrochloride 6-allyl-α-[bis(2-chloroethyl)-amino]-4-(10-chlorobenz[c]acridin-7-ylamino)-o-cresol, dihydrochloride The intermediate 2,2'-[5-(benz[c]acridin-7-ylamino)-2-hydroxybenzylimino]-diethanol, dihydrochloride is prepared by the following procedure: A mixture of 29.9 g. (0.10 mole) of 2,2'-(5-amino-2-hydroxybenzlimino)-diethanol dihydrochloride, 29.0 g. (0.11 mole) of 7-chlorobenz[c]acridine and 75 g. of phenol is stirred and heated on the steam bath for 3 hours. The cooled reaction mixture is poured slowly into 1 l. of acetone containing an excess of ethanolic hydrogen chloride. The acetone is decanted and the waxy precipitate is dissolved in dilute hydrochloric acid (decolorizing charcoal), filtered, and the filtrate made strongly alkaline with ammonium hydroxide. The base is extracted with chloroform, the combined chloroform extracts are washed successively with several portions of dilute sodium hydroxide and water and dried over anhydrous potassium carbonate. The chloroform is evaporated in vacuo, the residue is dissolved in absolute ethanol (decolorizing charcoal), treated with an excess of ethanolic hydrogen chloride and diluted with acetone. The precipitate is separated, dissolved in water, the water solution made strongly alkaline with ammonium hydroxide and the base extracted with ether. The combined ether extracts are washed with several portions of N acetic acid solution, the combined acetic acid extracts are made alkaline with ammonium hydroxide and the base again extracted with chloroform. The combined chloroform extracts are washed with water, dried over anhydrous potassium carbonate and the chloroform removed in vacuo. The residue is dissolved in absolute ethanol, treated with an excess of ethanolic hydrogen chloride and the ethanol solution poured into 2 l. of anhydrous ether with vigorous stirring. The desired 2,2'-[5-(benz[c]acridin-7-ylamino)-2 - hydroxybenzylimino]-diethanol dihydrochloride is collected by filtration, washed with anhydrous ether and dried in vacuo at 60° C. Upon exposure to the atmosphere, the hydrated salt melts at 105–110° C. (dec.).

In like manner, other intermediate 2,2'-[(benz[c]acridin-7-ylamino)-hydroxybenzylimino]-diethanols can be prepared starting with formaldehyde or a formaldehyde generating agent, diethanolamine, and the appropriate hydroxyacetanilide and halobenz[c]acridine.

*Example 7*

A mixture of 5.3 g. (0.01 mole) of dry 2,2'-[5-(benz[b]acridin-12-ylamino)-2-hydroxybenzylimino]-diethanol dihydrochloride and 100 ml. of thionyl chloride is stirred at room temperature for 20 hours. The excess thionyl chloride is removed in vacuo on the steam bath, and the residue is cautiously treated with absolute ethanol. The ethanol mixture is slowly poured with stirring into 1 l. of anhydrous ether and the red salt which separates is collected by filtration, washed thoroughly with anhydrous ether and dried in vacuo at 45° C. for 18 hours. This is the desired 4-(benz[b]acridin-12-ylamino)-α-[bis(2-chloroethyl)-amino]-o-cresol, dihydrochloride of formula:

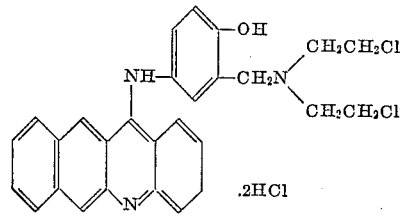

In like manner, the following related compounds can be prepared, starting from the appropriate 2,2'-[(benz[b]acridin - 12 - ylamino) - hydroxybenzylimino] - diethanol:

α - [Bis(2 - chloroethyl) - amino] - 4 - (2 - methoxybenz[b]-acridin-12-ylamino)-o-cresol, dihydrochloride α - [Bis(2 - chloroethyl) - amino] - 6 chloro - 4 - (2-chlorobenz[b]acridin-12-ylamino)-o-cresol, dihydrochloride α - [Bis(2 - chloroethyl) - amino] - 4 - (2,6 - dichlorobenz[b]acridin-12-ylamino)2,6-xylenol, dihydrochloride 6 - allyl - 4 - (benz[b]acridin - 12 - ylamino) - α - [bis(2-chloroethyl)-amino]-o-cresol, dihydrochloride The intermediate 2,2'-[5-(benz[b]acridin-12-ylamino)-2-hydroxybenzylamino]-diethanol dihydrochloride, employed as a starting material for the above procedure, can be prepared from 2,2'-(5-amino-2-hydroxybenzylimino)-diethanol dihydrochloride and 12-chlorobenz[b]acridine in accordance with the method set forth under Example 6 herein for the preparation of 2,2'-[5-(benz[c]acridin - 7 - ylamino) - 2 - hydroxybenzylimino] - diethanol dihydrochloride. Other intermediate 2,2'-[(benz[b]acridin - 12 - ylamino) - hydroxybenzylimino] - diethanols are prepared in like manner, starting from formaldehyde or a formaldehyde generating agent, diethanolamine and the appropriate hydroxyacetanilide and halobenz[b]acridine.

*Example 8*

A suspension of 21.2 g. (0.04 mole) of anhydrous 2,2'-[5 - (benz[a]acridin - 12 - ylamino) - 2 - hydroxybenzylimino]-diethanol, dihydrochloride in 400 ml. of thionyl chloride is stirred for 20 hours at room temperature. The excess thionyl chloride is removed in vacuo on the steam bath, and the residue stirred with absolute ethanol with cooling. The ethanol mixture is added to 3 l. of anhydrous ether in a thin stream with stirring and the orange-yellow precipitate which separates is collected by filtration and washed with anhydrous ether. This is the desired 4 - (benz[a]acridin - 12 - ylamino) - α - [bis(2-chloroethyl)-amino]-o-cresol, dihydrochloride of formula:

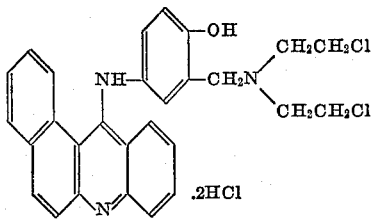

In like manner, the following related compounds can be prepared, starting from the appropriate 2,2'-[(benz[a]acridin - 12 - ylamino) - hydroxybenzylimino] - diethanol:

α - [Bis(2 - chloroethyl) - amino] - 4 - (9 - chlorobenz[a]acridin-12-ylamino)-o-cresol, dihydrochloride 4 - (benz[a]acridin - 12 - ylamino) - α - [bis(2 - chloroethyl)-amino]-2,6-xylenol, dihydrochloride 6 - [bis(2 - chloroethyl) - aminomethyl] - 4 (9 - chlorobenz[a]acridin - 12 - ylamino) - guaiacol, dihydrochloride 5 - (benz[a]acridin - 12 - ylamino) - α - [bis(2 - chloroethyl)-amino]-o-cresol, dihydrochloride The intermediate 2,2'-[5-(benz[a]acridin-12-ylamino)-2-hydroxybenzylimino]-diethanol, dihydrochloride, utilized as a starting material for the above procedure, can be prepared from 2,2'-(5-amino-2-hydroxybenzylimino)-diethanol, dihydrochloride and 12-chlorobenz[a]acridine in accordance with the method set forth under Example 6 herein for the preparation of 2,2'-[5-(benz[c]acridin-7 - ylamino) - 2 - hydroxybenzylimino] - diethanol dihydrochloride. Other intermediate 2,2'-[(benz[a]acridin-12-ylamino)-hydroxybenzylimino]-diethanols are prepared in like manner, starting from formaldehyde or a formaldehyde generating agent, diethanolamine and the appropriate hydroxyacetanilide and halobenz[a]acridine.

We claim:

1. A compound of the class consisting of free base diamino cresols and acid salts thereof having in free base form the formula:

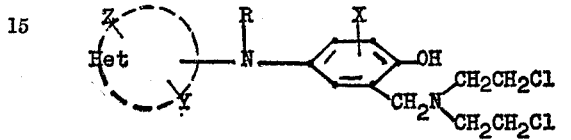

where Het is a radical of the class consisting of 4-quinolyl, 4-benzo(h)quinolinyl, 1-benzo(f)quinolinyl, 9-acridinyl, 12-benz(a)acridinyl, 12-benz(b)acridinyl, and 7-benz(c)-acridinyl, R is a member of the group consisting of hydrogen and lower alkyl radicals, and X, Y and Z are each a member of the group consisting of hydrogen, chlorine, bromine, lower alkoxy, lower alkyl, lower unsaturated alkyl and phenyl radicals.

2. α - [Bis(2 - chloroethyl) - amino] - 4 - (7 - chloro-4-quinolylamino)-o-cresol, dihydrochloride.

3. α - [Bis(2 - chloroethyl) - amino] 4 - (6 - methoxy-2-methyl-4-quinolylamino)-o-cresol, dihydrochloride.

4. α - [Bis(2 - chloroethyl) - amino] 4 - [(7 - chloro-4-quinolyl)-methylamino]-o-cresol, dihydrochloride.

5. α - [Bis(2 - chloroethyl) - amino] - 4 - (6 - chloro-2-methoxy-9-acridinylamino)-o-cresol, dihydrochloride.

6. 4 - (benz[c]acridin - 7 - ylamino) - α - [bis(2-chloroethyl)-amino]-o-cresol, dihydrochloride.

References Cited in the file of this patent

Burckhalter: Jour. Am. Chem. Soc., vol. 70, 1948, pp. 1363–1373.

Whitmore: Organic Chem., 2nd ed., 1951, Van Nostrand, N.Y., page 74.

UNITED STATES PATENT OFFICE
Certificate of Correction

Patent No. 2,883,382                                                                 April 21, 1959

Edward F. Elslager et al.

It is hereby certified that error appears in the printed specification of the above numbered patent requiring correction and that the said Letters Patent should read as corrected below.

Column 2, line 21, for "holaheterocycle" read —haloheterocycle—; line 52, for "crystalized" read —crystallized—; lines 57 to 67, the formula should appear as shown below instead of as in the patent:

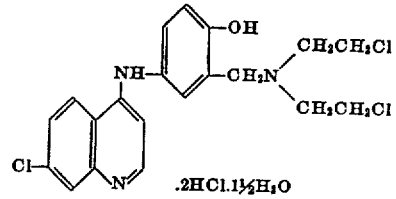

column 4, line 42, for "hydroxyacetamide" read —hydroxyacetanilide—; line 57, for "yl-amino" read —ylamino—; lines 59 to 68, the formula should appear as shown below instead of as in the patent:

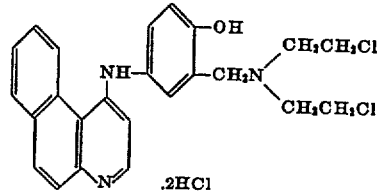

column 6, line 33, for "preperd" read —prepared—; line 66, for "alkyl" read —allyl—; column 7, line 48, should appear as shown below instead of as in the patent:

α-[bis(2-chloroethyl)-amino]-6-chloro-4-(10-methylbenz line 51, for "ylenol" read —xylenol—.

Signed and sealed this 6th day of September 1960.

[SEAL]

Attest:
ERNEST W. SWIDER,
*Attesting Officer.*

ROBERT C. WATSON,
*Commissioner of Patents.*